F. REGENOLD.
MEANS FOR LUBRICATING FLANGES OF CAR WHEELS.
APPLICATION FILED MAR. 5, 1908.
No. 921,162.
Patented May 11, 1909.
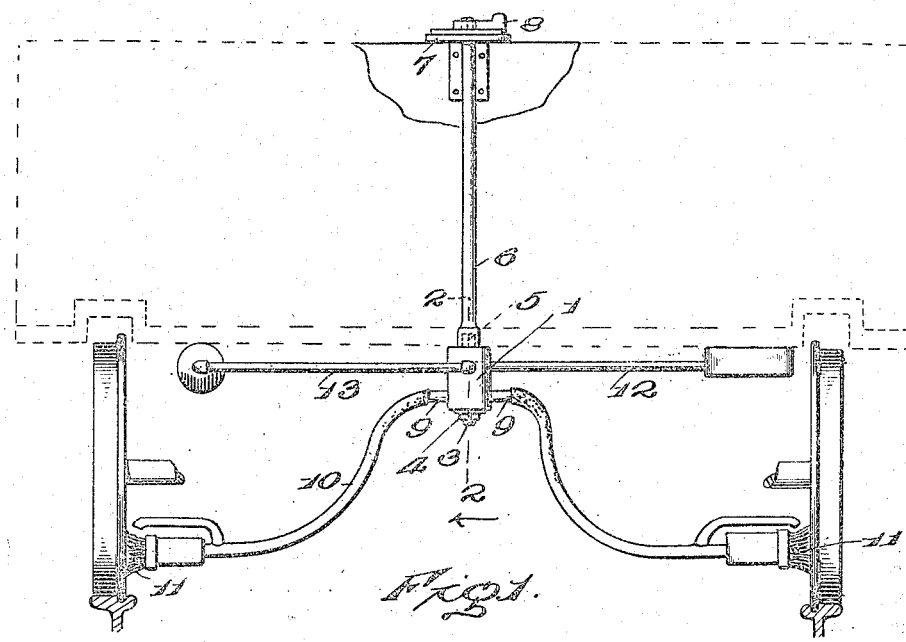
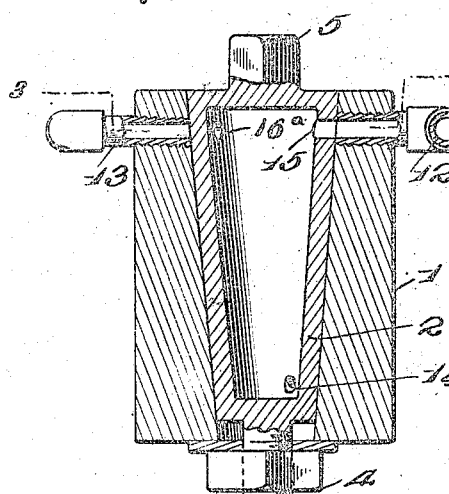
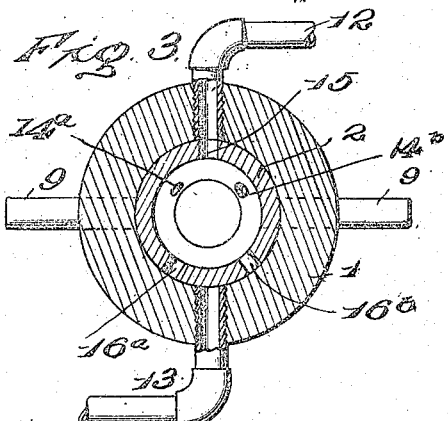
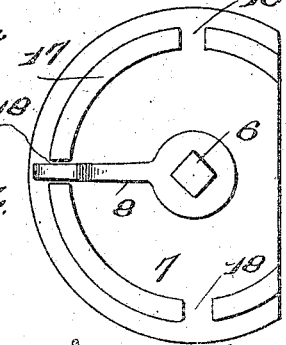

UNITED STATES PATENT OFFICE.

FREDERICK REGENOLD, OF MEMPHIS, TENNESSEE.

MEANS FOR LUBRICATING FLANGES OF CAR-WHEELS.

No. 921,162.   Specification of Letters Patent.   Patented May 11, 1909.

Application filed March 5, 1908. Serial No. 419,338.

*To all whom it may concern:*

Be it known that I, FREDERICK REGENOLD, citizen of the United States, residing at Memphis, in the county of Shelby and State of Tennessee, have invented certain new and useful Improvements in Means for Lubricating the Flanges of Car-Wheels, of which the following is a specification.

The present invention has for its object the provision of a novel mechanism for lubricating the flanges of car wheels, thereby obviating the necessity for employing a special attendant to grease the track rails at the curves.

The invention contemplates a lubricating device of this character embodying a novel construction for preventing excessive application and waste of the oil or lubricant and also for positively feeding the lubricant to the distributing pipe.

For a full description of the invention and the merits thereof and also to acquire a knowledge of the details of construction and the means for effecting the result, reference is to be had to the following description and accompanying drawings, in which:

Figure 1 is an end view of a portion of a car having the lubricating device applied thereto. Fig. 2 is an enlarged sectional view on the line 2—2 of Fig. 1. Fig. 3 is a horizontal sectional view on the line 3—3 of Fig. 2. Fig. 4 is a top plan view of the indicator plate and pointer coöperating therewith.

Corresponding and like parts are referred to in the following description and indicated in all the views of the drawings by the same reference characters.

According to the present invention the oil or lubricant is first fed into a chamber from a tank or reservoir mounted upon the car in any convenient position, and is subsequently discharged from this chamber into the distributing pipe, means being provided for throwing the chamber alternately into communication with the tank and distributing pipe, the capacity of the chamber limiting the amount of lubricant used at any single operation. It is also designed to utilize compressed air to force the oil or lubricant positively through the distributing pipe from the chamber and this compressed air is preferably derived from the air brake mechanism.

In the embodiment of the invention illustrated on the drawing, the numeral 1 designates the valve casing which may be mounted upon the car in any suitable position, preferably just below the front platform of the car. Rotatably mounted within the casing 1 is a valve plug 2 which tapers toward the lower end thereof and has a hollow formation. Projecting downwardly from the lower end of the valve plug is a threaded stem 3 receiving a nut 4 which serves to retain the plug in position within the valve casing and prevent accidental displacement thereof. An angular stud 5 is provided at the upper end of the plug 2 and is received within a socket at the lower extremity of an operating rod 6, the said operating rod extending upwardly through the platform of the car and through an indicator plate 7 secured to the car. Applied to the upper extremity of the rod 6 is a pointer 8 which coöperates with suitable characters upon the plate 7 to indicate the position of the valve plug. The lower portion of the casing 1 is provided upon opposite sides with lateral outlet openings receiving the discharge pipes 9. A piece of rubber hose or a similar flexible pipe communicates with each of the discharge pipes 9 and these flexible pipes serve to convey the oil or lubricant to the flanges of the wheels upon opposite sides of the car.

In the preferred embodiment of the invention the oil is discharged by means of the pipes or tubes 10 upon one side of brushes 11 which engage the wheel flanges. Leading to the upper portion of the casing 1 is a feed pipe 12 which is designed to convey the oil to the interior of the plug 2 from an oil tank or reservoir mounted upon the car in any suitable position. A second pipe 13 also leads to the upper portion of the valve casing and is in communication with the air brake mechanism or other source of supply of compressed air. Lateral openings 14$^a$ and 14$^b$ are formed in the lower portion of the valve plug 2 and are designed to establish communication between the chamber within the valve plug and the discharge pipes 9 leading to the wheels upon opposite sides of the car. In a similar manner it will be observed that the upper portion of the plug 2 is formed with the lateral opening 15 designed to establish communication between the chamber of the valve and the feed pipe 12, and also with the lateral openings 16$^a$ and 16$^b$ either one of which may establish communication between the plug and the air supply pipe 13. These various openings are so arranged with reference to each other that when the pointer 8 coöperates with the indicator plate 7 to show that the valve is closed, the lateral opening 15 is in communication with the supply pipe 12 and the remaining openings are closed. The oil or lubricant then flows into the chamber or plug 2 until the same has been filled. Upon turning the pointer 8 in one direction to open the valve, the openings 14ª and 16ª will be caused to communicate respectively with one of the discharge pipes 9 and the air supply pipe 13, and at the same time communication with the feed pipe 12 will be closed. The air entering the reservoir of the plug will then serve to force the lubricant positively through the discharge pipe, but the amount of lubricant used will be limited to that retained within the chamber of the valve, since the flow of oil from the tank is shut off when the valve is opened. In a similar manner by turning the pointer 8 in the opposite direction to open the valve the openings 14ᵇ and 16ᵇ will be thrown into communication with the opposite discharge pipe 9 and the air supply pipe 13 respectively and the flange of the wheel upon the opposite side of the car will be lubricated.

With this construction it will be readily apparent that lubricant can be supplied to the flanges of the wheels upon either side of the car as may be required, and that excessive application of the lubricant is prevented since the quantity of oil which can be discharged at a single operation is limited by the capacity of the chamber within the valve plug.

More specifically describing the indicator plate 7 it will be observed that the same is provided upon its upper face with a segmental rib 17 having the three notches 18 formed therein any one of which is designed to receive the pointer 8 for the purpose of locking the operating rod 6 against accidental rotation. When the pointer is in the middle notch 18 the valve is closed, while by lifting the pointer from the said notch and moving it into engagement with either of the end notches the valve can be opened to discharge lubricant through either of the pipes 9.

Having thus described the invention, what is claimed as new is:

1. In a lubricating device of the character described, the combination of a casing, an air supply pipe leading to the casing, a plurality of distributing pipes communicating with the casing, a hollow plug valve rotatably mounted within the casing, the said plug valve being formed with one set of openings designed to establish communication with any selected one of the distributing pipes by suitably turning the plug valve and also with a second set of openings for simultaneously establishing communication with the air supply pipe, and means for filling the hollow plug valve with lubricant when it is turned to shut off communication with the air supply pipe and distributing pipes.

2. In a lubricating device of the character described, the combination of a casing, a feed pipe leading to the casing, an air supply pipe leading to the casing, a plurality of distributing pipes leading from the casing, and a hollow plug valve rotatably mounted within the casing, the said plug valve being formed with one set of openings designed to establish communication with any selected one of the distributing pipes when the valve is suitably rotated, and with a second set of openings for simultaneously establishing communication with the air supply pipe, an opening being also provided for establishing communication with the feed pipe when the valve is rotated to shut off communication with the air supply pipe and distributing pipes.

3. In a lubricating device of the character described, the combination of a casing, a hollow plug valve rotatably mounted within the casing and provided with an angular stud, a feed pipe leading to the valve, a distributing pipe leading from the valve, an operating rod provided with a socket for receiving the angular stud and constituting a means for turning the plug to throw the interior thereof into communication with either the feed pipe or the distributing pipe, an indicator plate, and a pointer carried by the operating rod and coöperating with the indicator plate to show the position of the valve.

In testimony whereof I a˜ ˙ my signature in presence of two witnesses.

FREDERICK h ɟENOLD.

Witnesses:
GEO. W. GRAVES.
J. D. ALLEN